L. A. BEARDSLEY.
Hop-Frame.
No. { 2,173, 33,177. }
Patented Sept. 3, 1861.
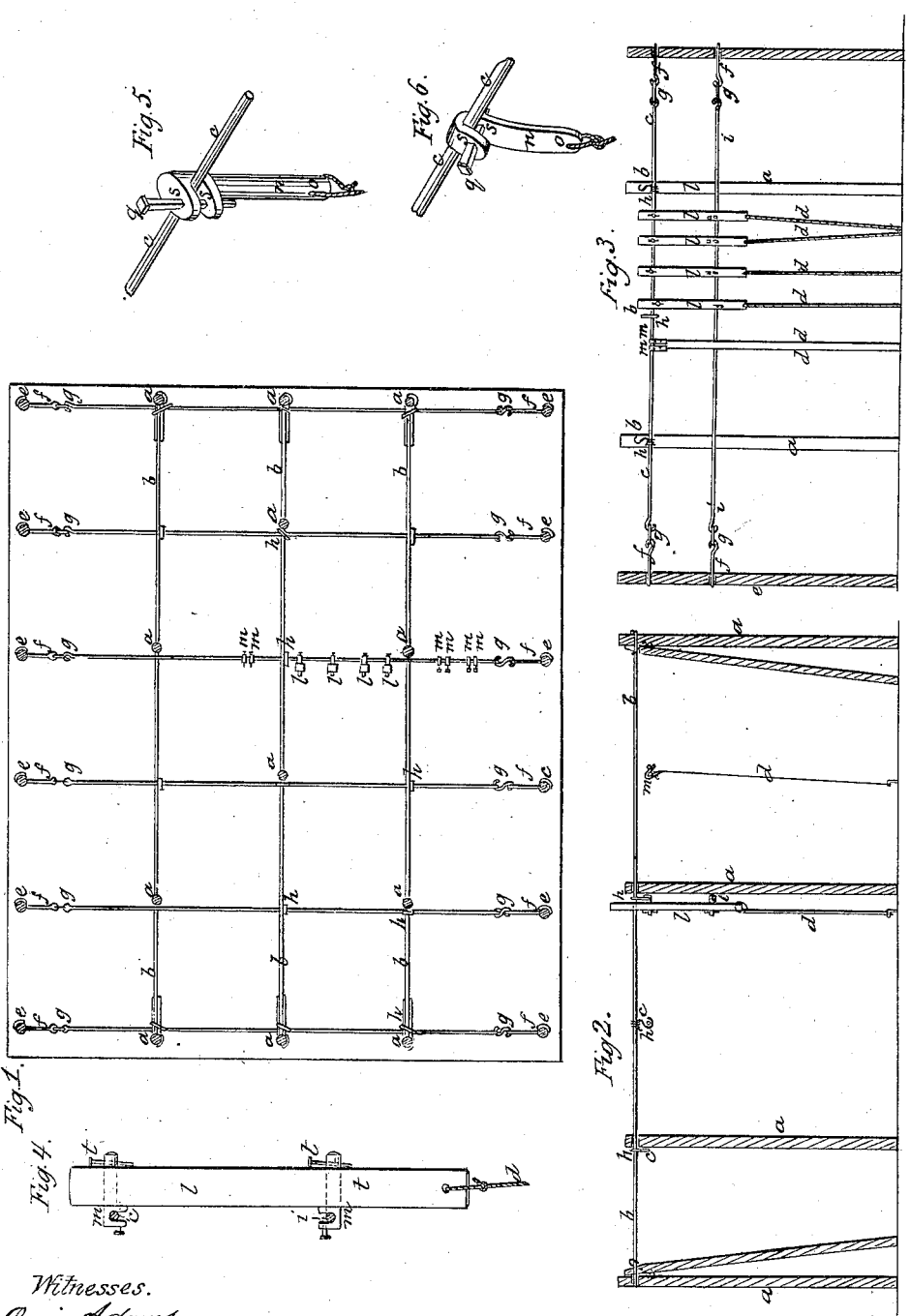
Witnesses.
Orrin Adams.
H. Bennell.
Inventor.
Levi A. Beardsley

UNITED STATES PATENT OFFICE.

LEVI A. BEARDSLEY, OF SOUTH EDMESTON, NEW YORK.

IMPROVEMENT IN HOP-FRAMES.

Specification forming part of Letters Patent No. 33,177, dated September 3, 1861.

*To all whom it may concern:*

Be it known that I, LEVI A. BEARDSLEY, of South Edmeston, in the county of Otsego and State of New York, have invented certain new and useful Improvements in Hop-Frames; and I do hereby declare that the following is a full, clear, and exact description of the same, reference being had to the accompanying drawings, forming part of this specification, in which—

Figure 1 is a plan view of a hop-frame embodying my improvements. Fig. 2 represents a vertical section through the post at the line A B, Fig. 1. Fig. 3 is a vertical section through the posts at the line C D, Fig. 1. Fig. 4 shows the manner of attaching the tie-poles to the sustaining-wires. Fig. 5 shows a clamp for attaching the training-cords and tie-poles to the sustaining-wires, and Fig. 6 illustrates a modification of the device shown in Fig. 5.

My invention relates to that kind of hop-frame wherein horizontal wires are employed to sustain the perpendicular cords or wires to which the vines are trained, having for an object to lessen the number of the posts which support the sustaining-wires, and to support the said wires in such a manner that they may be readily lowered to facilitate the gathering of the ripe hops, and may be replaced securely for the further ripening of those which remain; and my invention has for a further object a secure method by which training cords or wires or poles may be secured to the sustaining-wires, permitting their ready detachment and replacement.

To these ends my said invention consists in the use of horizontal wires permanently stretched between properly-secured posts in combination with detachable horizontal sustaining-wires, which are supported from the fixed wires by hooks or equivalents therefor, which will permit the ready loosening of the sustaining-wires from the fixed wires by which they are supported, substantially as and for the purpose hereinafter set forth.

My said invention also consists in the combination of two parallel sustaining-wires, one above the other, with connecting transverse tie-poles and keying-clamps, substantially as and for the purpose hereinafter set forth.

My said invention also consists in the peculiar form and arrangement of the hereinafter-described keying-clamps which secures the training-cords or the tying-poles to the sustaining wire, as set forth.

To enable others skilled in the art to make and use my invention, I will proceed to a description thereof.

In the accompanying drawings, in all the figures of which the same part is indicated by similar letters of reference, $a\ a$ represent stout posts, which are firmly driven into the ground and stand in rows forming a right angle with the rows of hop-vines. These posts are so set that a post in one row comes about half-way between two posts in the adjoining row. The end posts in all the rows are firmly braced by a diagonal brace running into the ground, and a stout wire, $b$, is stretched along each row of posts, and is firmly secured to them near their tops.

$c\ c$ are horizontal wires lying below the wires $b$ parallel with and directly over the rows of hop-vines. They form therefore a right angle with the wires $b$. These wires $c$ serve to sustain the upper ends of the training-cords $d$, the lower ends of which are staked to the ground near the vine, and I therefore term them the "sustaining-wires." The ends of the wires $c$ are formed into eyes or hooks, and are attached to posts planted at each end of the row of hop-vines, and also furnished with wire eyes or hooks $f$ by S-shaped hooks $g$.

The weight of the sustaining-wires and of the vines on the training-cords is supported at intermediate points from the fixed wires $b$ by S-shaped hooks $h$, which I prefer to attach with twine to one or the other of these wires in such a manner as to prevent a metallic connection between the two wires, whereby danger to the yard from lightning-strokes is lessened. The free end of the hook can of course be hooked onto or unhooked from the other wire at pleasure. The sustaining-wires $c$ are thus supported by the posts $e$ at each end and by the fixed wires $b$ at intermediate points in such a manner that they or any part of them may readily be unloosed from their supports and be lowered temporarily to any required degree to facilitate the operations of gathering the hops and of training the vines. Because of the peculiar relative positions of the posts

*a*, already described, each of the wires *c* is alternately supported by the wires *b* at points very near to the posts *a* and at points about midway between them, as is clearly shown in Fig. 1. A saving in the number of posts is thus effected, while at the same time the wires *c* are quite rigidly supported.

To form a more rigid frame-work for the support of the vines in situations exposed to high winds, I provide in such cases a second sustaining-wire, *i*, parallel with and below the wire *c*, and fastened to the posts *e* by hooks *g*. This wire *i* is firmly tied to the wire *c* by short perpendicular poles or strips *l*, which extend a short distance above the wire *c* and below the wire *i*, and are securely clamped to both the said wires by peculiar keying-clamps, which are hereinafter described. The upper ends of the training-cords are tied to the lower ends of the tie-poles, and the vines thus can run up onto and entwine the poles and be more firmly supported than by the wires *c* alone; but the secondary wires *i* and the tie-poles may in most cases be dispensed with, and the upper ends of the training-cords may be attached to the sustaining-wires *c* by means of the metallic clamp *m*, by which the said cords may be rigidly attached to the wires *c*, but so that they may easily be detached and taken down to facilitate the training of the vines.

Two modifications of the clamp *m* are shown in perspective by Figs. 5 and 6 as attached to the sustaining-wire *c*, in which *n* is the shank, which may be made cylindrical. This shank is perforated at its lower end by a hole, *o*, into which the end of the training-cord *d* may be tied. The upper end of the shank *n* is formed into an open jaw of suitable opening to embrace the sustaining-wire *c*. Each side of this jaw is perforated by a hole, *s*, and these are in such position that when a wedge, *q*, which may be a common nail, is driven through these holes the said wedge will force the wire *c* against the back of the jaw and firmly secure the clamp to the said wire.

To detach the clamp from the wire *c* it is only necessary to drive out the wedge *q*, when it can readily be unhooked from the wire.

I make use of the same clamp *m* to fasten the tie-poles *l* to the wires *c* and *i* as is illustrated in Fig. 4, in which case the clamps *m* are keyed onto the wires so as to stand out horizontally. The shanks of the clamps enter holes in the tie-poles and project through them far enough to receive a nail, *t*, in the hole in the end of the shank, which keys or wedges the pole onto the clamp in a manner which permits its easy removal.

Having thus described my improvements, what I claim as my invention, and desire to secure by Letters Patent, is—

1. The employment of permanently-fixed horizontal wires in combination with detachable horizontal sustaining-wires supported by the permanent wires, and arranged substantially in the manner hereinbefore set forth, for the purposes specified.

2. The combination of two parallel sustaining-wires, the one above the other, with the connecting tie-poles *l* and keying-clamps *m*, substantially as and for the purpose set forth.

3. The keying-clamp *m*, constructed substantially as hereinabove described, in combination with the training-cords, for the purpose set forth.

LEVI A. BEARDSLEY.

Witnesses:
 ORRIN ADAMS,
 H. BENNETT.